United States Patent [19]
Umeda et al.

[11] Patent Number: 6,040,922
[45] Date of Patent: *Mar. 21, 2000

[54] DEVICE AND METHOD FOR FACSIMILE AND DATA COMMUNICATION

[75] Inventors: Takashi Umeda, Yokosuka; Motoyasu Ohno, Tokyo, both of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/444,588
[22] Filed: May 19, 1995

[30] Foreign Application Priority Data

May 20, 1994 [JP] Japan ..................... 6-106547

[51] Int. Cl.$^7$ ............................................ H04N 1/32
[52] U.S. Cl. ............................................ 358/468; 358/425
[58] Field of Search .................. 358/468, 425, 358/434–439

[56] References Cited

U.S. PATENT DOCUMENTS

| | | | |
|---|---|---|---|
| 4,353,097 | 10/1982 | Takeda et al. | 358/287 |
| 5,495,581 | 2/1996 | Tsai | 395/154 |

FOREIGN PATENT DOCUMENTS

| | | |
|---|---|---|
| 1-058147 | 3/1989 | Japan . |
| 4-207557 | 7/1992 | Japan . |

OTHER PUBLICATIONS

IBM Technical Disclosure Bulletin, vol. 37, No. 2A, Feb. 28, 1994, Armonk (US) p. 559, XP000433444 Anonymous: "nonstandard extension for facsimile transfer protocol".

*Primary Examiner*—Thomas D. Lee
*Assistant Examiner*—Stephan Brinich
*Attorney, Agent, or Firm*—Lowe Hauptman Gopstein Gilman & Berner

[57] ABSTRACT

In a communication between transmitter-side and receiver-side communication control devices, when a data communication is desired after a facsimile communication without opening a telephone line, the transmitter-side communication control device transmits a data communication shift request signal to the receiver-side communication control device based on a previous command inputted to the transmitter-side communication control device. In response to this request signal, the receiver-side communication control device switches a communication mode from a facsimile communication mode to a data communication mode, and then sends back a data communication shift acknowledge signal to the transmitter-side communication control device. In response to this acknowledge signal, the transmitter-side communication control device switches a communication mode from a facsimile communication mode to a data communication mode. Accordingly, the data communication can be performed automatically after the facsimile communication without once opening the line. Such a data communication after the facsimile communication may also be realized based on a data communication shift request signal from the receiver-side communication control device.

10 Claims, 5 Drawing Sheets

DEVICE AND METHOD FOR FACSIMILE AND DATA COMMUNICATION

BACKGROUND OF THE INVENTION

1. Field of the Invention

The present invention relates to a communication control device and a communication control method, and more specifically, to a communication mode switching in a communication via a public line between computers each handling facsimile data for a facsimile communication and other data for a data communication.

2. Description of the Prior Art

There have been available a voice communication, a facsimile communication and a data communication as communications using the public line, such as, the telephone line. Recently, data communication modems capable of handling facsimile data as well have been rapidly developed and commercially available. However, in the conventional communication control devices incorporating those data communication modems, once a facsimile communication mode is set, a data communication mode can not be effected until the line is once opened and another call is made. Specifically, once the facsimile communication mode is set, a communication procedure pursuant to CCITT (International Telegraph and Telephone Consultative Committee) Recommendation T. 30 is performed between transmitter-side and receiver-side communication control devices or terminals.

The conventional facsimile communication procedure will be explained hereinbelow with reference to a flowchart shown in FIG. 5.

Step S1 executes a phase A, wherein a call is made and a line is connected or established between the transmitter-side and receiver-side terminals. Specifically, a caller switches a communication mode from a data communication mode to a facsimile communication mode and then dials a number for connection to the receiver-side terminal. In response to this, the receiver-side terminal automatically closes the direct current loop to establish the line for the facsimile communication. The procedure then advances to a phase B. As appreciated, in case of the manual calling/receiving operation, a caller offhooks a handset and dials the number for connection to the receiver-side terminal, and then performs a voice communication with a receiver upon offhook of a handset by the receiver. Thereafter, the facsimile communication mode is established between the transmitter-side and receiver-side terminals through the given manual operation. The procedure then advances to the phase B.

Step S2 executes the phase B, wherein transmission of facsimile or image data is set ready. Specifically, the transmitter-side and receiver-side terminals perform preparation of transmission and reception, display and determination of terminal constants, confirmation of a synchronous condition, and the like. The procedure then advances to a phase C.

Step S3 executes the phase C, wherein transmission of the image data, confirmation thereof, holding of the synchronous condition, and the like are performed. Upon completion of transmission of one-page image data, the procedure advances to a phase D.

Step S4 executes the phase D, wherein message transmission, confirmation thereof, and the like are performed. If image data transmission is continued (step S4-1), the procedure returns to step S2 (phase B) or step S3 (phase C) depending on an image attribute of one-page image data to be transmitted next (step S4-2), so as to repeat image data transmission. On the other hand, after transmission of image data of the final page, the procedure advances to step S5. Step S5 executes a phase E, wherein the line is opened or disconnected.

Hereinbelow, the phase D will be explained in further detail with reference to FIGS. 6–8.

FIG. 6 is a diagram showing a communication sequence between the transmitter-side and receiver-side terminals, wherein an image attribute of one-page image data to be transmitted next (hereinafter referred to as "next one-page image data") and that of one-page image data transmitted immediately before (hereinafter referred to as "last one-page image data") are the same with each other. As shown in FIG. 6, the transmitter-side terminal transmits a multi-page signal (MPS) 52 after completion of transmitting one-page image data 51. Upon detection of MPS 52, the receiver-side terminal sends back a message confirmation signal (MCF) 53. This causes both the transmitter-side and receiver-side terminals to be set for the phase C, that is, for transmission of the next one-page image data.

FIG. 7 is a diagram showing a communication sequence between the transmitter-side and receiver-side terminals, wherein an image attribute of the next one-page image data and that of the last one-page image data differ from each other. As shown in FIG. 7, the transmitter-side terminal transmits an end-of-message signal (EOM) 62 after completion of transmitting one-page image data 61. Upon detection of EOM 62, the receiver-side terminal sends back a message confirmation signal (MCF) 63. This causes both the transmitter-side and receiver-side terminals to be set for the phase B, that is, for preparation of transmission of the next one-page image data.

FIG. 8 is a diagram showing a communication sequence between the transmitter-side and receiver-side terminals, wherein image data of the final page are transmitted. As shown in FIG. 8, the transmitter-side terminal transmits an end-of-procedure signal (EOP) 72 after completion of transmitting one-page image data 71. Upon detection of EOP 72, the receiver-side terminal sends back a message confirmation signal (MCF) 73. This causes both the transmitter-side and receiver-side terminals to be set for the phase E so that the line is opened.

As appreciated from the foregoing explanation, in the conventional communication system, although the image data of a plurality of pages can be transmitted without disconnecting the line, once the communication mode is switched to the facsimile communication mode, the line is unconditionally disconnected when transmission of the image data of all the pages has been finished. Accordingly, even when the data communication is desired after the facsimile communication, it is impossible to perform the data communication until a call is again made to establish the line for the data communication. In other words, the manual operation is always necessary for performing the data communication after the facsimile communication.

SUMMARY OF THE INVENTION

Therefore, it is an object of the present invention to provide an improved communication control device.

It is another object of the present invention to provide an improved communication control method.

According to one aspect of the present invention, a communication control device comprises a network control unit for connection to a public line; command input means for inputting a command to perform a facsimile communication and a data communication in a continuous manner; switching control means for controlling switching between the facsimile communication and the data communication, the switching means transmitting a data communication shift request signal to a counter-side communication party after the facsimile communication based on the inputted command, the data communication shift request signal requesting a shift to the data communication at the counter-side communication party; and communication control means having a facsimile communication control function and a data communication control function for controlling the facsimile communication or the data communication based on the switching control by the switching control means, wherein the switching control means commands the communication control means to switch from the facsimile communication to the data communication after receiving a data communication shift acknowledge signal which is transmitted from the counter-side communication party in response to the data communication shift request signal.

According to another aspect of the present invention, a communication control method comprises the steps of inputting at a transmitter side a command to perform a facsimile communication and a data communication in a continuous manner; establishing a line with a receiver side for transmission of image data; transmitting a data communication shift request signal to the receiver side after transmitting the image data, the data communication shift request signal requesting a shift to the data communication; and performing the data communication with the receiver side through the established line after receiving a data communication shift acknowledge signal which is sent from the receiver side in response to the data communication shift request signal.

According to another aspect of the present invention, a communication control method comprises the steps of inputting at a receiver side a command to perform a facsimile communication and a data communication in a continuous manner; establishing a line between the receiver side and a transmitter side for receiving image data from the transmitter side; transmitting a data communication shift request signal to the transmitter side after receiving the image data, the data communication shift request signal requesting a shift to the data communication; and performing the data communication with the transmitter side through the established line after receiving a data communication shift acknowledge signal which is sent from the transmitter side in response to the data communication shift request signal.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, a preferred embodiment of the present invention will be described hereinbelow with reference to the accompanying drawings.

Figure 1:
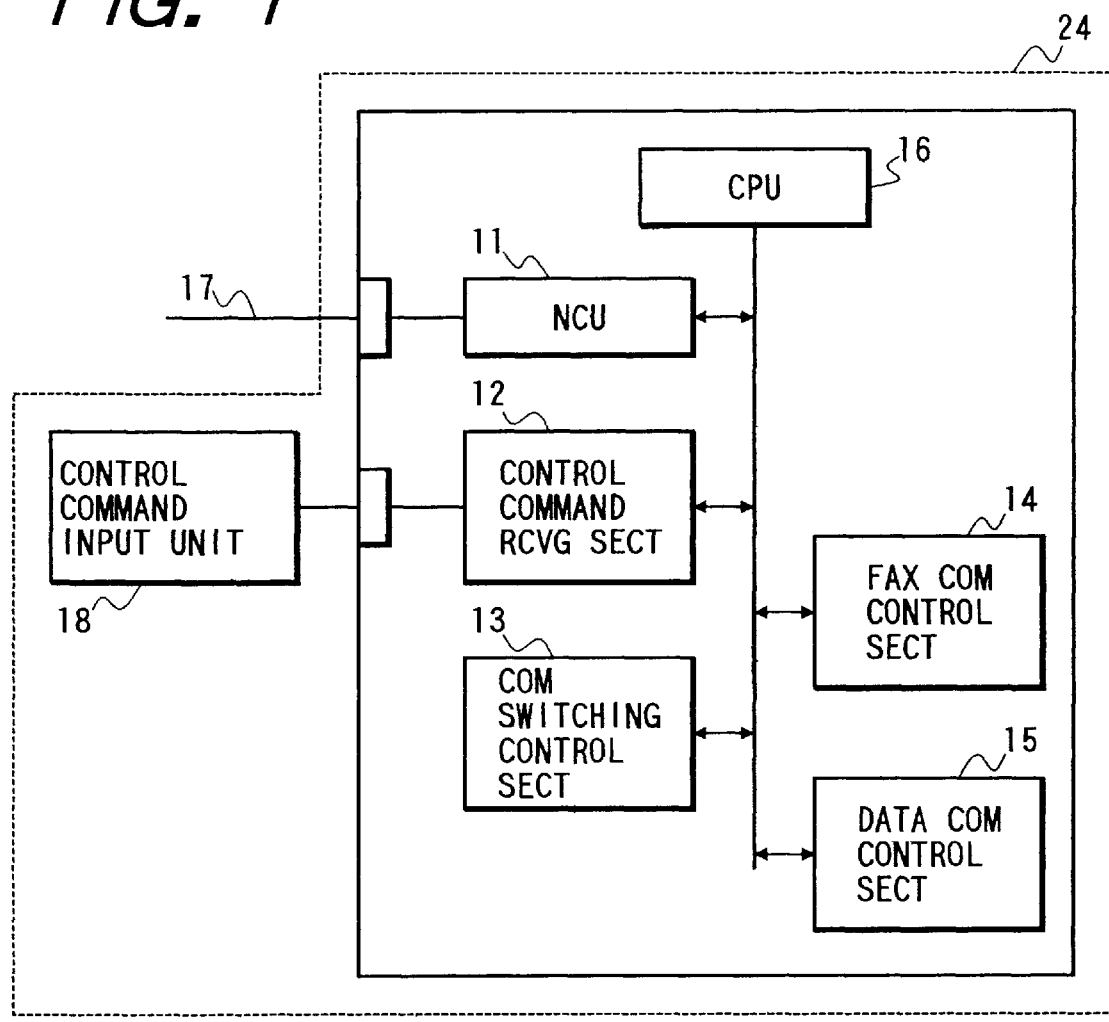
FIG. 1 is a block diagram showing a schematic structure of a communication control device according to a preferred embodiment of the present invention.

FIG. 1 is a block diagram showing a schematic structure of a communication control device 24 according to the preferred embodiment. In the figure, the communication control device 24 includes a network control unit (NCU) 11 for connection to the public line 17, such as, the telephone line, and a control command receiving section 12 for receiving various commands from a control command input unit 18. Through the control command input unit 18, an operator can input necessary commands into the communication control device 24. For example, the operator can input a command to perform the facsimile communication and the data communication in a continuous manner without once opening the line. The communication control device 24 further includes a communication switching control section 13 for controlling switching between the facsimile communication and the data communication, a facsimile communication control section 14 for controlling the facsimile communication, a data communication control section 15 for controlling the data communication, and a central processing unit (CPU) 16 for controlling operations of the NCU 11, the control command receiving section 12, the communication switching control section 13, the facsimile communication control section 14 and the data communication control section 15.

Figure 2:
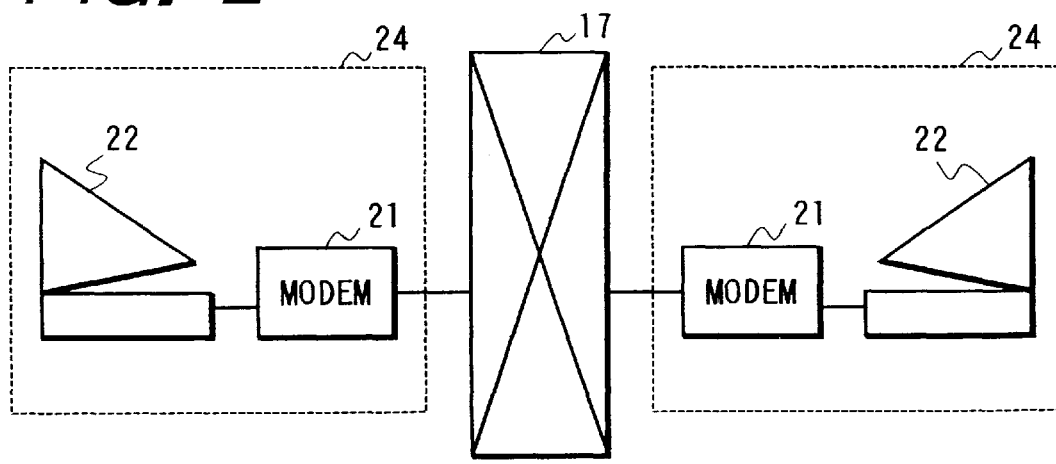
FIG. 2 is a diagram for explaining a communication between a pair of the communication control devices, one shown in FIG. 1.

FIG. 2 is a diagram showing a communication system for explaining a communication between a pair of the communication control devices 24, each one being of the type shown in FIG. 1. In FIG. 2, the communication control device 24 includes a data modem 21 and a host computer 22, such as, a personal computer, a work station or a large computer. The host computer 22 corresponds to the control command input unit 18 and is connected to the data modem 21 for controlling it. The data modem 21 is in turn connected to the public line 17.

Now, communication sequences between the transmitter-side communication control device 24 and the receiver-side communication control device 24 will be described with reference to FIGS. 3 and 4. In the following description, the host computer 22 controls the data modem 21 using AT commands during the data communication and TIA/EIA-592 commands during the facsimile communication. The latter commands are +F-extended AT commands which make possible the facsimile communication control. On the other hand, the host computer 22 may control the data modem 21 in different manners.

Figure 3:
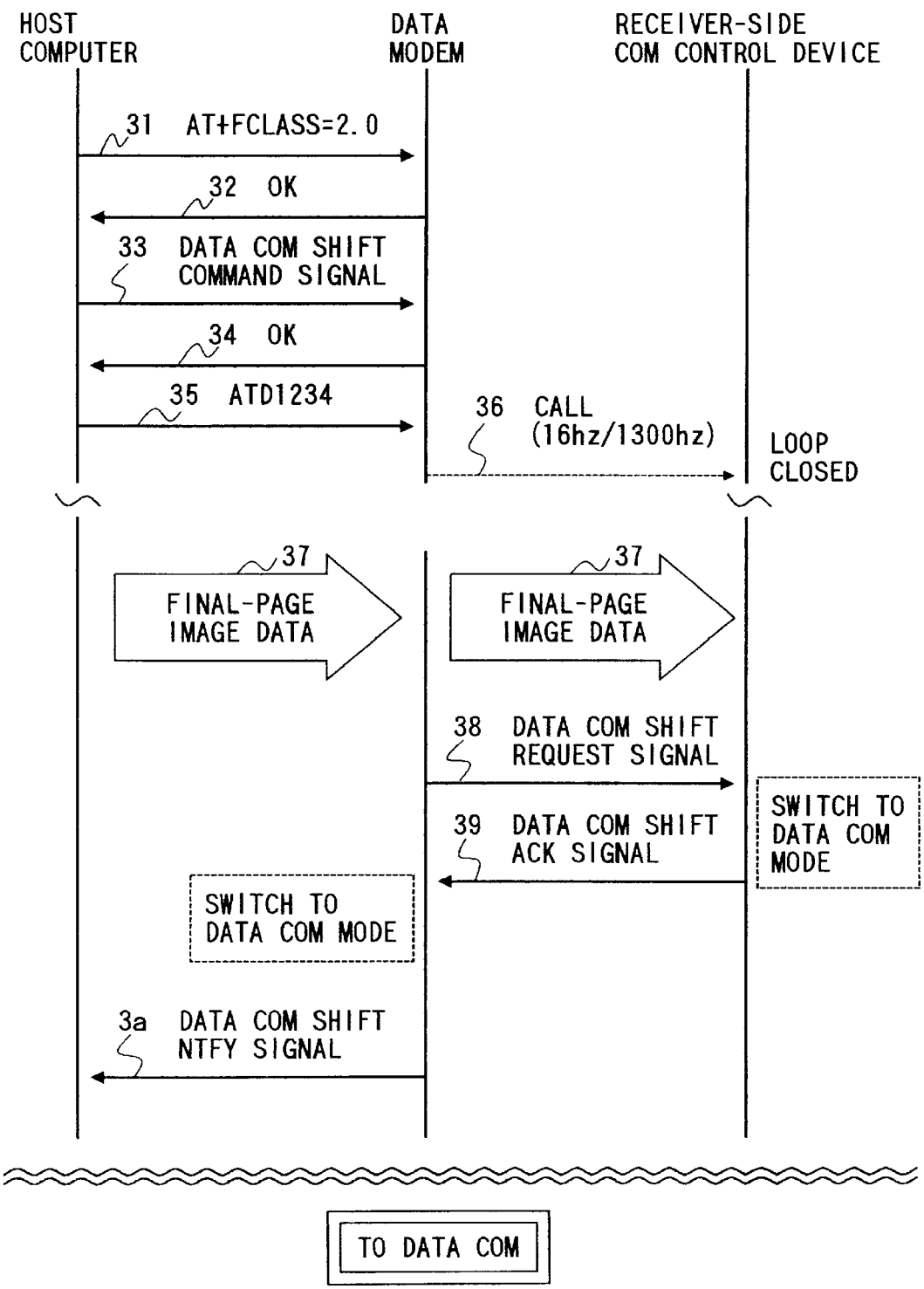
FIG. 3 is a diagram showing a communication sequence between the transmitter-side and receiver-side communication control devices, wherein a continuous execution of a data communication after a facsimile communication is commanded or requested at the transmitter-side communication control device.

FIG. 3 is a diagram showing the communication sequence between the transmitter-side and receiver-side communication control devices 24, wherein the continuous execution of the data communication after the facsimile communication is commanded or requested at the transmitter-side communication control device 24.

First, before making a call, the host computer 22 sends AT+FCLASS=2.0 (31) to the data modem 21 and receives OK (32) therefrom. AT+FCLASS=2.0 (31) is a TIA/EIA-592 command to switch the communication mode of the data modem 21 from the data communication mode to the facsimile communication mode. Further, the host computer 22 sends a data communication shift command signal (33) to the data modem 21 and receives OK (34) therefrom. The signal (33) is an originally-extended unique command developed in this preferred embodiment for commanding the data modem 21 beforehand to automatically execute the data communication after transmission of image data of the final page.

Subsequently, the host computer 22 sends ATD (35) to the data modem 21 so that the data modem 21 makes a call (36) to the receiver-side communication control device 24. Numerals 1234 following ATD represents a telephone number of the receiver. In response to this call, the receiver-side communication control device 24 automatically closes the direct current loop so that the line is established for the facsimile communication. Now, the communication procedure advances to the phase B (preparation of image data transmission) as described before in the prior art. In case of the manual calling/receiving operation, the call (36) is made after the caller offhooks a handset, and the facsimile communication mode is established between the transmitter-side and receiver-side communication control devices 24 when the receiver offhooks a handset and switches the communication mode to the facsimile communication mode.

Since the communication procedure of the phase B (preparation of image data transmission) and the phase C (image data transmission) is the same as that in the foregoing prior art, explanation thereof will be omitted hereinbelow for brevity.

In case the data modem 21 has received the data communication shift command signal (33) in advance from the host computer 22, the data modem 21 transmits a data communication shift request signal (38) to the receiver-side communication control device 24 after transmission of the final-page image data (37). The data communication shift request signal (38) is a signal for requesting the data communication after the facsimile communication without disconnecting the line and sent to the receiver-side communication control device 24 only after transmission of the final-page image data (37). This signal (38) is an originally-extended unique command developed in this preferred embodiment.

On the other hand, in case the data modem 21 has received no data communication shift command signal (33), the data modem 21 transmits the end-of-procedure signal (EOP) to the receiver-side communication control device 24 as described before in the prior art. As appreciated, when the transmitted image data are not those of the final page, the data modem 21 transmits the multi-page signal (MPS) or the end-of-message signal (EOM) to the receiver-side communication control device 24 depending on a relationship between image attributes of the last one-page image data and the next one-page image data as also described before in the prior art.

Upon detection of the data communication shift request signal (38), the receiver-side communication control device 24 switches the communication mode from the facsimile communication mode to the data communication mode, and then sends back a data communication shift acknowledge signal (39) to the transmitter-side communication control device 24. The data communication shift acknowledge signal (39) is a signal for acknowledging that the data communication can be performed after the facsimile communication without opening the line. This signal (39) is an originally-extended unique command developed in this preferred embodiment.

Upon detection of the data communication shift acknowledge signal (39), the data modem 21 in the transmitter-side communication control device 24 switches the communication mode from the facsimile communication mode to the data communication mode, and then sends a data communication shift notify signal (3a) to the host computer 22 for notifying that the data communication mode is entered.

Accordingly, the transmitter-side and receiver-side communication control devices 24 are shifted to the data communication mode substantially at the same time to allow the data communication therebetween.

Figure 4:
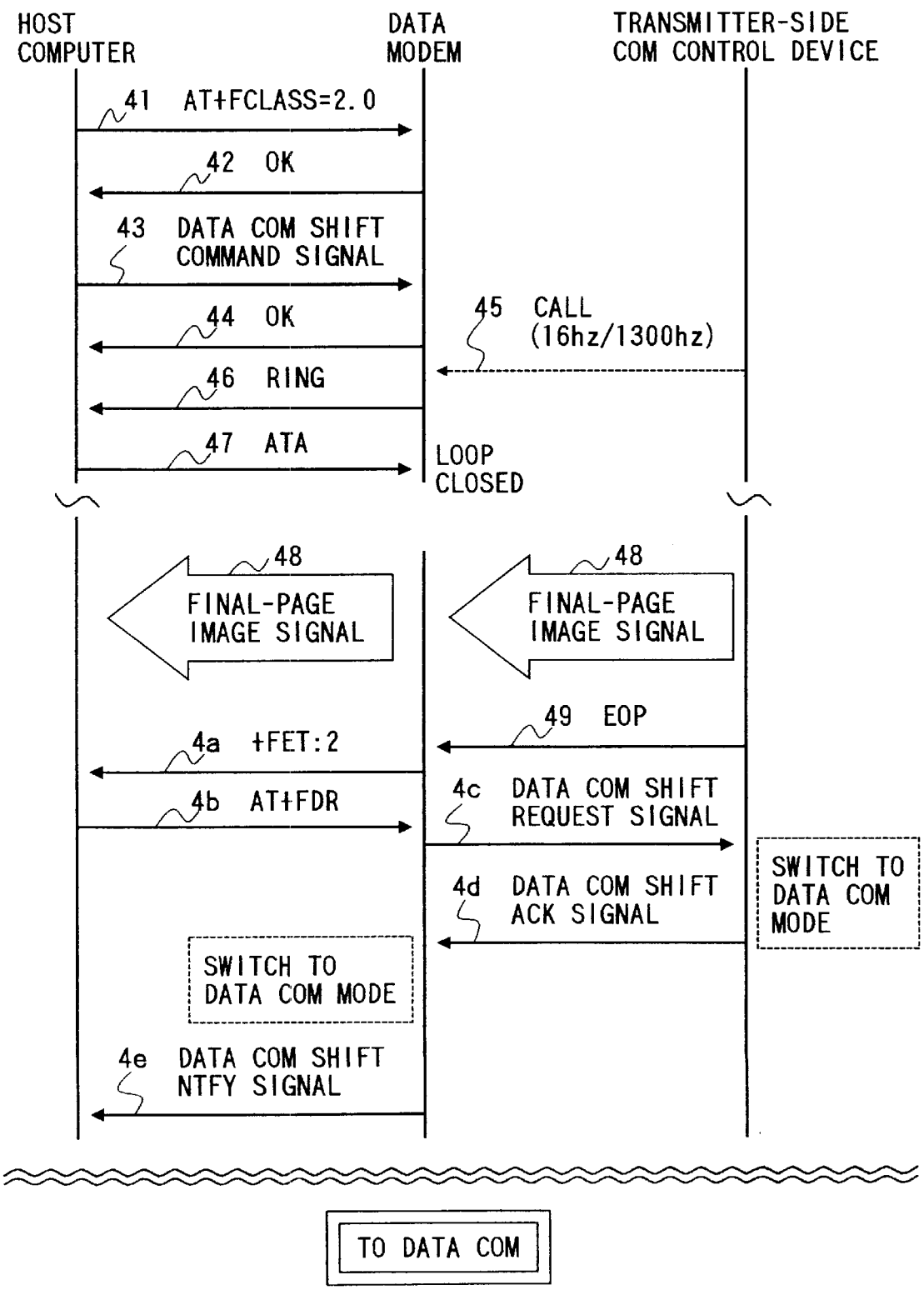
FIG. 4 is a diagram showing a communication sequence between the transmitter-side and receiver-side communication control devices, wherein the continuous execution of the data communication after the facsimile communication is commanded or requested at the receiver-side communication control device.
Figure 5:
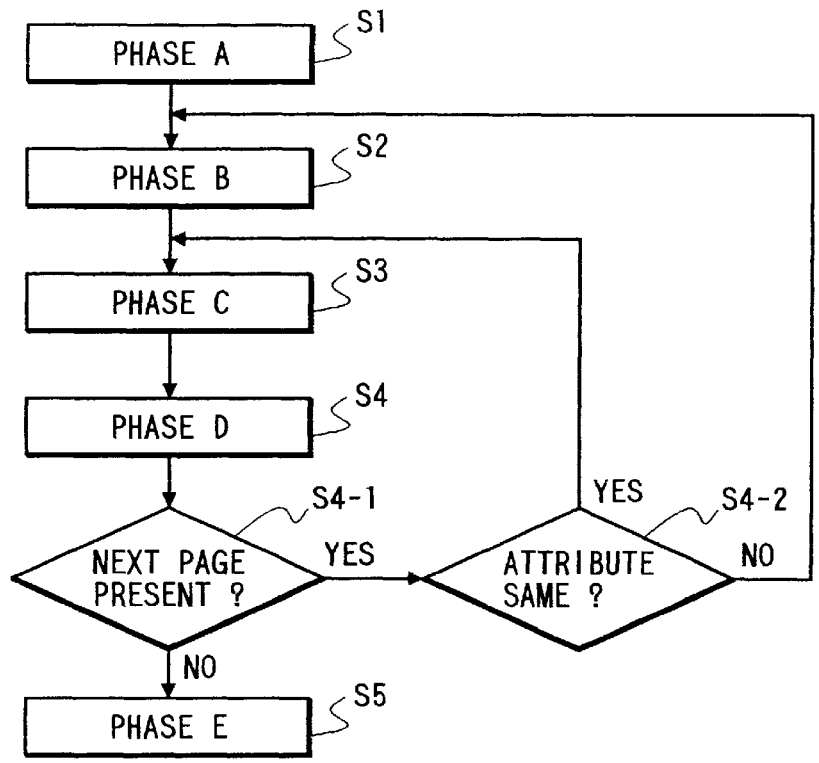
FIG. 5 is a flowchart showing a facsimile communication procedure in the prior art.
Figure 6:
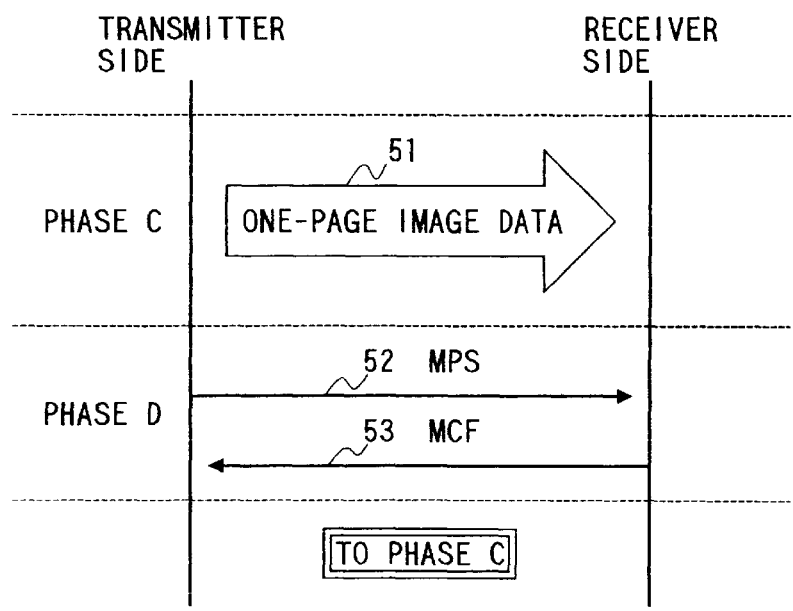
FIG. 6 is a diagram showing a communication sequence between transmitter-side and receiver-side communication control devices, wherein an image attribute of one-page image data to be transmitted next and that of one-page image data transmitted immediately before are the same with each other.
Figure 7:
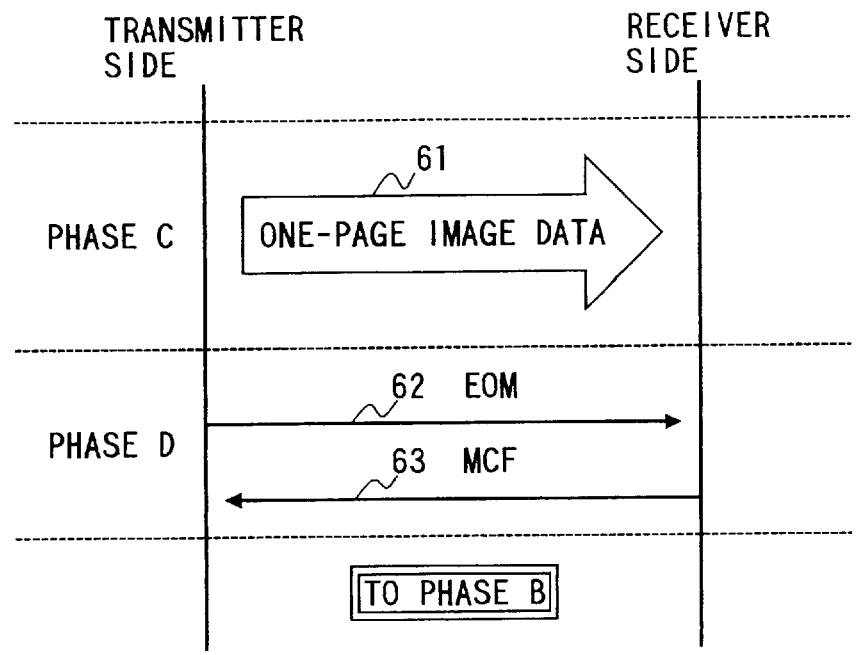
FIG. 7 is a diagram showing a communication sequence between the transmitter-side and receiver-side communication control devices, wherein an image attribute of one-page image data to be transmitted next and that of one-page image data transmitted immediately before differ from each other.
Figure 8:
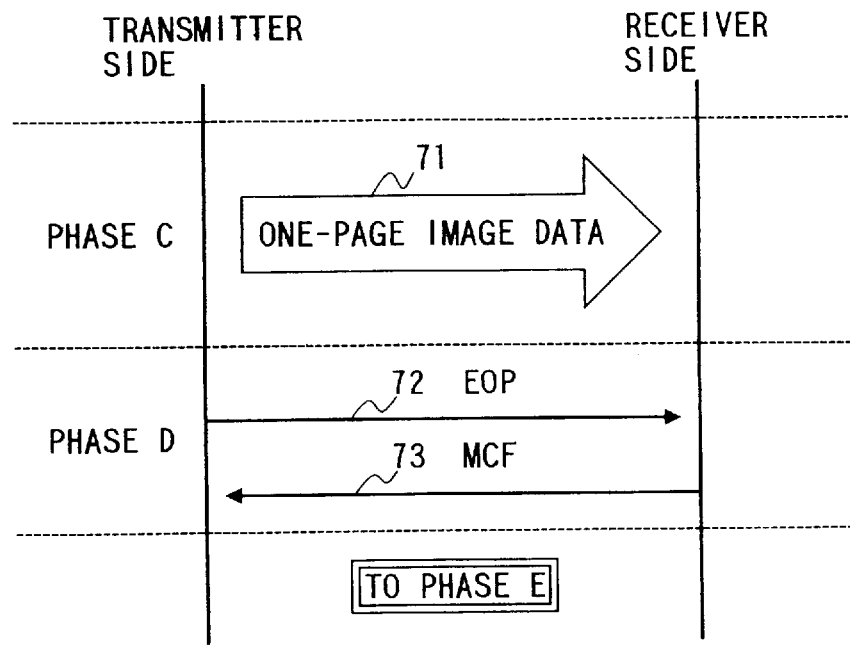
FIG. 8 is a diagram showing a communication sequence between the transmitter-side and receiver-side communication control devices, wherein image data of the final page are transmitted.

FIG. 4 is a diagram showing the communication sequence between the transmitter-side and receiver-side communication control devices 24, wherein the continuous execution of the data communication after the facsimile communication is commanded or requested at the receiver-side communication control device 24.

First, before receiving a call, the host computer 22 sends AT+FCLASS=2.0 (41) to the data modem 21 and receives OK (42) therefrom, so as to switch the communication mode of the data modem 21 from the data communication mode to the facsimile communication mode. Further, the host computer 22 sends a data communication shift command signal (43) to the data modem 21 and receives OK (44) therefrom. As in FIG. 3, the signal (43) is an originally-extended unique command developed in this preferred embodiment for commanding the data modem 21 beforehand to automatically execute the data communication after reception of image data of the final page from the transmitter-side communication control device 24.

Upon detection of a call (45) from the transmitter-side communication control device 24, the data modem 21 sends RING (46) to the host computer 22. In response to RING (46), the host computer 22 sends back ATA (47) to the data modem 21 so that the data modem 21 closes the direct current loop to establish the line for the facsimile communication with the transmitter-side communication control device 24. Now, the communication procedure advances to the phase B (preparation of image data transmission) as described before in the prior art.

Since the communication procedure of the phase B (preparation of image data transmission) and the phase C (image data transmission) is the same as that in the foregoing prior art, explanation thereof will be omitted hereinbelow for brevity.

After receipt of the final-page image data (48) from the transmitter-side communication control device 24, the receiver-side communication control device 24 receives the end-of-procedure signal (EOP) (49) from the transmitter-side communication control device 24. As described before in the prior art, the transmitter-side communication control device 24 transmits EOP (49) after transmission of the final-page image data (48). Accordingly, in case the data modem 21 has received no data communication shift command signal (43) in advance from the host computer 22, the data modem 21 transmits the message confirmation signal (MCF) to the transmitter-side communication control device 24 so that the communication procedure advances to the phase E to open the line.

On the other hand, in case the data modem 21 has received the data communication shift command signal (43) in advance from the host computer 22, the data communication mode is effected without opening the line as in the following manner:

First, upon detection of EOP (49), the data modem 21 in the receiver-side communication control device 24 sends a TIA/EIA-592 command +FET:2 (4a) to the host computer 22 to notify the detection of EOP (49). "2" in +FET:2 represents the end-of procedure signal (EOP). In response to +FET:2 (4a), the host computer 22 sends a TIA/EIA-592 command AT+FDR (4b) to the data modem 21 for requesting the data modem 21 to execute the next sequence step. In response to AT+FDR (4b), the data modem 21 transmits a data communication shift request signal (4c) to the transmitter-side communication control device 24. The data communication shift request signal (4c) is a signal for requesting the data communication after the facsimile communication without disconnecting the line and sent to the transmitter-side communication control device 24 only after reception of the final-page image data (48). This signal (4c) is an originally-extended unique command developed in this preferred embodiment.

Upon detection of the data communication shift request signal (4c), the transmitter-side communication control device 24 switches the communication mode from the facsimile communication mode to the data communication mode, and then sends back a data communication shift acknowledge signal (4d) to the receiver-side communication control device 24. The data communication shift acknowledge signal (4d) is a signal for acknowledging that the data communication can be performed after the facsimile communication without opening the line. This signal (4d) is an originally-extended unique command developed in this preferred embodiment.

Upon detection of the data communication shift acknowledge signal (4d), the data modem 21 in the receiver-side communication control device 24 switches the communication mode from the facsimile communication mode to the data communication mode, and then sends a data communication shift notify signal (4e) to the host computer 22 for notifying that the data communication mode is entered.

Accordingly, the transmitter-side and receiver-side communication control devices 24 are shifted to the data communication mode substantially at the same time to allow the data communication therebetween.

As described above, in the foregoing preferred embodiment, the data communication can be performed automatically after the facsimile communication without opening the line, based on the request either at the transmitter or receiver side.

It is to be understood that this invention is not to be limited to the preferred embodiment and modifications described above, and that various changes and modifications may be made without departing from the spirit and scope of the invention as defined in the appended claims.

What is claimed is:

1. A communication control device comprising:

a host computer; and a data modem connected to said host computer for establishing communication between said host computer and a separate counterpart communication terminal, said host computer feeding a predetermined command to said data modem before establishment of said communication, so as to command said data modem to shift to a data communication after performing a facsimile communication between said host computer and said counterpart communication terminal via said data modem, and said data modem responding to a data communication shift acknowledge signal, received from said counterpart communication terminal after performing said facsimile communication, by feeding a predetermined notification signal to said host computer thereby carrying out a data communication shift process for implementing data communication with said counterpart communication terminal.

2. The communication control device according to claim 1, wherein said predetermined command comprises an AT command signal for switching to the facsimile communication and a subsequent non-standard signal for switching from the facsimile communication to the data communication.

3. The communication control device according to claim 1 wherein, when said communication control device operates as a transmitter, said host computer sends said predetermined command to said data modem and said data modem responds thereto by sending a confirmation signal to said host computer prior to transmission of a signal initiating a call to said separate counterpart communication terminal.

4. The communication control device according to claim 3, wherein said data modem transmits a predetermined data communication shift request signal to said separate counterpart communication terminal after transmission of final-page image data thereto.

5. The communication control device according to claim 4, wherein said data modem feeds said predetermined notification signal to said host computer in response to receiving a data communication shift acknowledge signal from said counterpart communication terminal after said data modem transmits said predetermined data communication shift request signal to said counterpart communication terminal.

6. The communication control device according to claim 5, wherein said data modem thereby performs said data communication with said separate counterpart communication terminal for data transmission without opening a communication line therebetween following conclusion of said facsimile communication.

7. The communication control device according to claim 1 wherein, when said communication control device operates as a receiver, said host computer sends said predetermined command to said data modem and said data modem responds thereto by sending a confirmation signal to said host computer, said data modem sending a ring signal to said host computer in response to reception of a signal initiating a call from said separate counterpart communication terminal after sending said confirmation signal.

8. The communication control device according to claim 7, wherein said data modem transmits a predetermined data communication shift request signal to said separate counterpart communication terminal after receiving final-page image data and an end of procedure signal from said separate counterpart communication terminal.

9. The communication control device according to claim 8, wherein said data modem feeds said predetermined notification signal to said host computer in response to receiving a data communication shift acknowledge signal from said counterpart communication terminal after said data modem transmits said predetermined data communication shift request signal to said counterpart communication terminal.

10. The communication control device according to claim 9, wherein said data modem thereby performs said data communication with said separate counterpart communication terminal for data transmission without opening a communication line therebetween following conclusion of said facsimile communication.

* * * * *